No. 740,746. PATENTED OCT. 6, 1903.
W. S. FARNSWORTH.
BUTTER MOLD.
APPLICATION FILED APR. 27, 1903.
NO MODEL. 2 SHEETS—SHEET 1.

Witnesses:— Inventor,
Willis S. Farnsworth
By Geo. H. Strong.
atty

No. 740,746. PATENTED OCT. 6, 1903.
W. S. FARNSWORTH.
BUTTER MOLD.
APPLICATION FILED APR. 27, 1903.
NO MODEL. 2 SHEETS—SHEET 2.
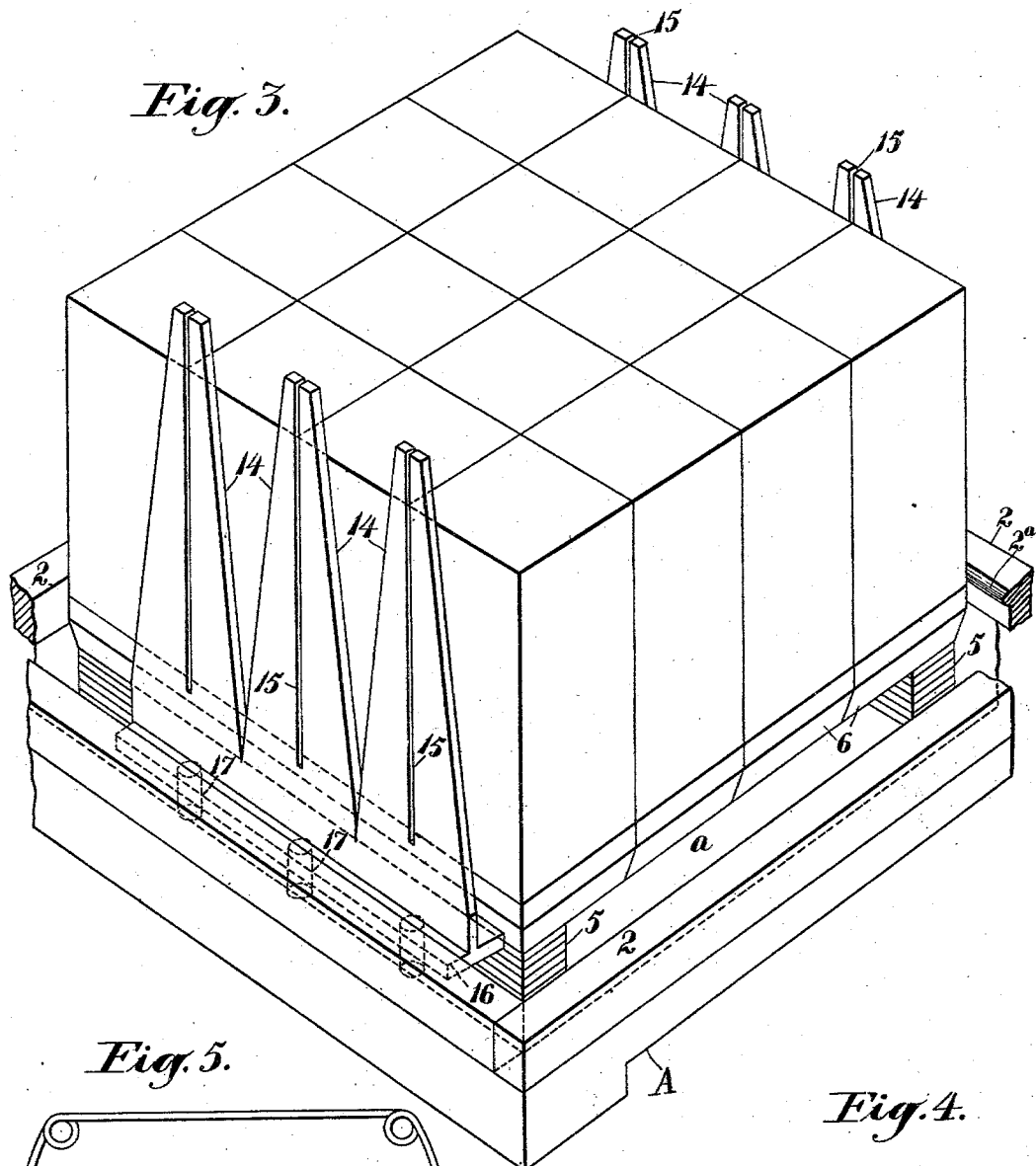
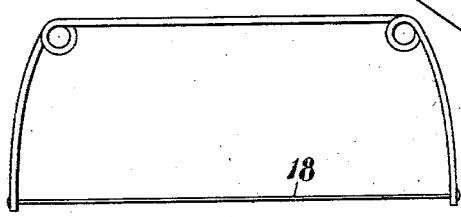
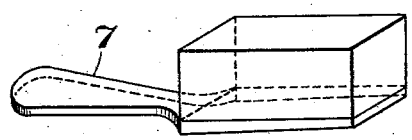
Witnesses:— Inventor,
Willis S. Farnsworth
By Geo. H. Strong.
atty No. 740,746.

Patented October 6, 1903.

UNITED STATES PATENT OFFICE.

WILLIS SMITH FARNSWORTH, OF HEALDSBURG, CALIFORNIA.

BUTTER-MOLD.

SPECIFICATION forming part of Letters Patent No. 740,746, dated October 6, 1903.

Application filed April 27, 1903. Serial No. 154,553. (No model.)

*To all whom it may concern:*

Be it known that I, WILLIS SMITH FARNSWORTH, a citizen of the United States, residing at Healdsburg, county of Sonoma, State of California, have invented an Improvement in Butter Molds and Cutters; and I hereby declare the following to be a full, clear, and exact description of the same.

My invention relates to an apparatus for molding butter in suitable rectangular masses and after cooling to separate the mass into "cubes" or "rectangular rolls," so called, of required size and weight.

It consists of a base, a box mounted upon said base composed of separable sides, with means for locking said sides to the base and to each other to form a mold within which the mass of butter is shaped, a means for separating and removing the mold sides after the butter is cooled without mutilating the mass, and cutter-guides with means for attaching them to the base, so that the butter may be separated into the desired forms.

It also comprises removable bottom sections fitting the base and separable upon the lines of the cuts made in the butter, and receivers upon which the butter may be transferred from said bottoms without handling.

My invention also comprises details of construction which will be more fully explained by reference to the accompanying drawings, in which—

Figure 1:
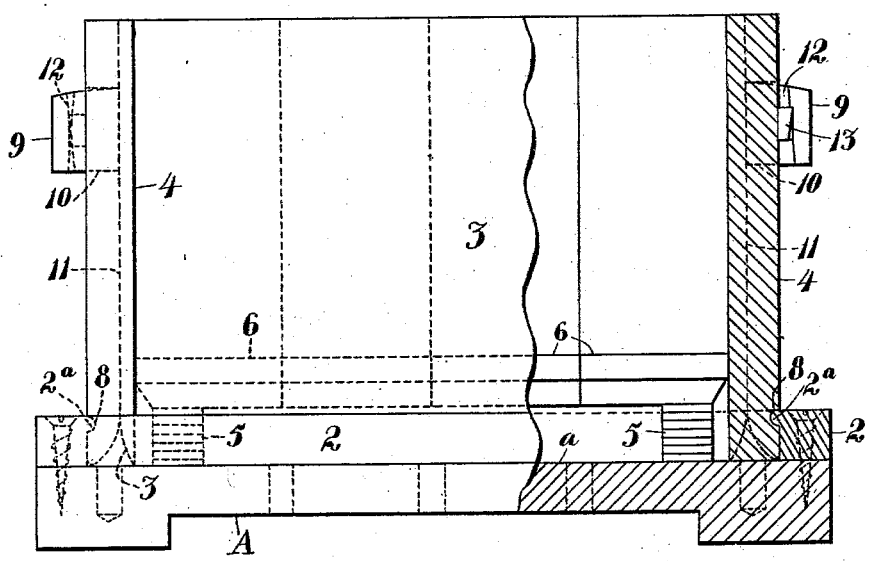
Figure 2:
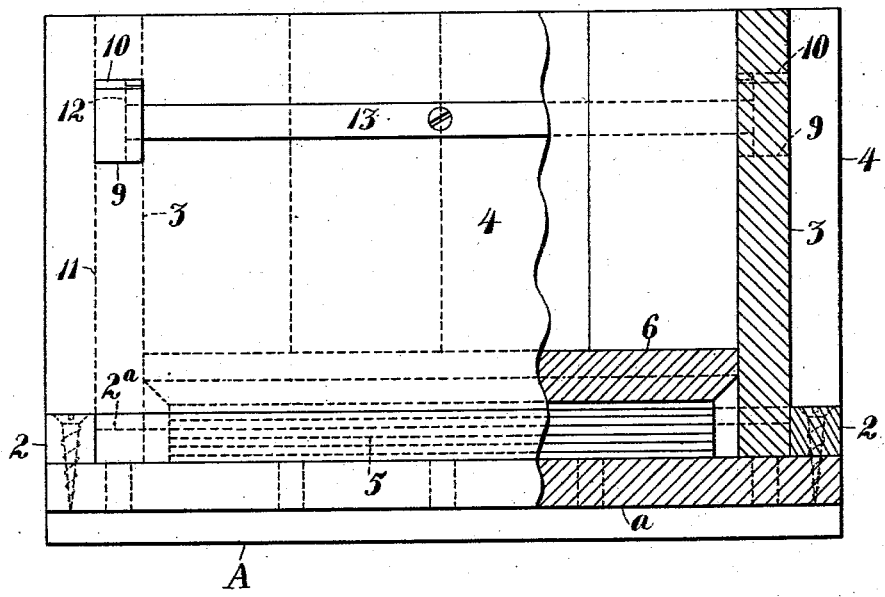

Figure 1 is a partial sectional elevation of the mold. Fig. 2 is a similar view at right angles with Fig. 1. Fig. 3 is a perspective view showing the mold sides removed and the cutter-guides in position. Fig. 4 shows a roll of butter upon a receiver. Fig. 5 is a view of the cutter.

It is the object of my invention to provide a convenient mold in which a mass of butter may be packed and shaped to a form which will contain any multiples of the "rectangular rolls," (as they are called,) which form the unit of measurement, as one pound, one and one-half pounds, or two pounds, to provide a means for securely interlocking the sides of this mold and securing them to the base, means by which they may be readily disengaged and removed from the butter without sliding thereon, so as to mutilate the mass, supplemental devices attachable to the base forming guides for a cutter by which the mass may be accurately divided into the units or packages in which the butter is eventually marketed, and means for removing these packages to be packed without any contact of the hands.

A is a base, made of wood or suitable material, preferably having an open center and surrounding rails or ledges 2, which form a border within which the sides 3 and ends 4 are set. The length of the sides and ends is determined by the amount of butter which it is desirable to mold at each operation.

These molds may be of any size capable of holding from two to thirty of the rectangular rolls or packages into which the butter is eventually separated, and they may have a depth such as to form rolls of any desired weight. These packages are, strictly speaking, rectangular packages having various length and diameter. The technical name for these packages is "rolls," and in hereinafter describing the packages I shall employ this designation for them.

It will be understood that the bottom of the apparatus, if small, might be made entire and without central openings; but for the larger sizes it is lighter and more convenient to make it with a central opening and a ledge $a$, projecting inwardly within the raised ledges 2 to serve as a support for the sides and ends of the mold and also to receive the transverse bars 5. These bars are preferably made, as shown, of superposed layers or strips which may be secured together and the bars themselves secured by screws or otherwise upon the ledges $a$, extending across the open center of the mold. The bottom boards 6 of the mold are supported upon these transverse bars and are of such a length and total width as to leave a sufficient vertical space between themselves and the ledges 2 to receive the side and end sections of the mold, which fit closely. The length of the bottom boards may be equal to the multiple of the number of rolls into which the mass is to be cut. Thus in the present case I have shown the mold as being of a size to form sixteen rolls and each of these bottom boards will therefore be of a length to support four rolls standing on end. The division-lines between these bottom boards are such that each board is just equal to the transverse width of the rolls which are supported upon it, so that when the mass of butter has been formed and subdivided and the sides of the mold removed these bottom boards can be each lifted separately with the roll standing on end upon it, and the butter may be transferred upon the receivers 7 by simply tilting the bottom boards in line with a series of four of these receivers, which have handles, as shown, so that the separate rolls can be transferred without ever being touched by the hands.

In order to secure the sides and ends of the mold to the base, I have shown two opposite sections of the ledge 2 as formed with inwardly-projecting flanges or extensions, as shown at $2^a$. These may be formed upon either the sides or the ends, depending upon the shape of the mold.

If the mold be exactly square, as in the present case, it will be understood that the projections $2^a$ may be made upon either of the opposing bars which form the ledge. I prefer, however, to make them upon the ones which form the ends of the mold, and the bottoms of these ends are correspondingly grooved, as at 8, so that by tilting them when they are introduced into the space between the ledges 2 and the bottom boards 6 these grooves would be made to engage the projections $2^a$, and thus interlock the ends firmly with the base, while the inner faces of the sides and ends fit against the edges of the bottoms 6. At a suitable point intermediate between the bottom and the top of the sides 4 are projecting tenons 9, and these are so formed as to slip through mortises 10, made in the end boards, so that when the side boards are set in and brought into a vertical position the tenons or dowels 9 will pass through the mortises 10 and project a little outside. In order to insure a snug fit and a unitary structure when the sides and ends are secured together, the ends are channeled, as shown at 11, so that the vertical edges of the sides 3 fit into these channels. The portions of the tenons 9 which project outside beyond the outer faces of the sides 3 have grooves or channels 12 cut vertically in them, and these are engaged by swinging bars 13, which are centrally pivoted, and the ends will engage with the grooves 12, and thus securely lock the sides and ends together. The grooves 12 preferably have one side inclined, and the ends of the bars 13 are made wedge-shaped or inclined in the direction of their movement when engaging the grooves 12. The object of this is to draw the sides firmly against the abutting ends and form close joints at the angles of the mold. The mold being thus completed, there is no danger of the parts being separated from each other or from the base. It may then be filled with the butter and packed solid, the top being leveled off by a striker in any usual or suitable manner. The butter being comparatively soft when first packed into the boxes, it is desirable to allow it to become hard, and it is therefore left in the mold until this result takes place either by artificial or natural cooling. The sides are then disengaged from the ends by first turning the locking-bars 13 and disengaging them from the tongues 9. The ends may then be tilted outwardly and disengaged from the locking-flanges $2^a$ and then lifted clear of the butter and removed without further contact. The sides are similarly tilted, and the butter then remains standing on the base-board 6. The next portion of the operation consists in cutting the butter into the rectangular rolls in which it is to be packed for the market. The size of these rolls to make a certain weight for a certain length having been determined, it will be easy to make all the rolls within the mold of substantially the same weight by building up the transverse bars 5, so that the depth from the bottom 6 to the top taken with the transverse diameters of the rolls will make a certain weight. I then fit guides or standards into the spaces in the surrounding ledge $a$ exterior to the bottom boards 6. These guides are preferably in the form of vertical bars or standards 14, having vertical slits 15 made in them. These standards 14 are fitted into a base or bases 16 either by mortising, doweling, or otherwise.

I have here shown a number of standards corresponding with the number of divisions which are to be made in the mass which has been formed within the mold, divided as hereinbefore described. Such a mass being capable of forming sixteen rolls, I have shown three of the standards 14 fixed to a single base 16. This base is provided with pins or equivalent locking devices, as at 17, and these pins fit into corresponding holes made in the ledge $a$ of the base. A set of these standards having been placed, for instance, at each end of the mass of butter after the mold has been removed, a suitable cutter is introduced into the slots 15 at opposite ends and sawed down to the bottom, thus separating the mass. The channels 15 in the standards 14 serve as guides to give the cutter the proper direction and insure a straight cut, and by reason of these guiding channels or slots having the two sides the cutter will be removed in the same line that it made its cut. There is no danger of slicing off a small piece on the return, as would be the case when there is only one side to the guide. When all the cuts have been made in one direction, the standards 14 are removed and replaced on the sides of the ledge $a$ and the cutters again used to subdivide the pieces into the proper-sized rectangular rolls. The cutter may be of any suitable description. I have here shown it as made of wire 18, stretched tightly between the ends of a frame which is preferably formed of elastic steel, so as to maintain the proper tension on the cutting-wire. When the butter has thus been subdivided, it is only necessary to lift the bottom boards 6 successively, and the receivers 7, which are about the length and width of a roll, being laid side by side and equal in number to the number of rolls on one of the bottom boards 6, the latter may be tipped slightly and the butter rolls transformed to the receivers 7. These having handles, it is then only necessary to transfer the butter to the place where it is to be wrapped and lay it upon the wrapping material without ever touching it with the hands.

Having thus described my invention, what I claim, and desire to secure by Letters Patent, is—

1. The combination in a butter-mold of a base having upturned ledges with horizontal interiorly-projecting flanges upon two opposite ledges, sides and ends adapted to interlock at their meeting edges and two of said sides having grooves or channels corresponding with the flanges whereby they are secured to the base.

2. The combination in a butter-mold of a base having upwardly-projecting surrounding ledges and horizontal flanges projecting inwardly from two opposite sides, mold sides adapted to stand within said ledges and transverse grooves or channels formed in two of said sides adapted to engage the flanges of the ledges, interlocking tenons and mortises formed in the meeting edges of the sides and means for securing the tenons in the mortises.

3. The combination in a butter-mold of a base, vertical separable sides, means including ledges on the base and a flange-and-groove connection between the ledges and the sides for engaging and locking sides to the base, mortises formed in two opposite sides, corresponding tenons in the other sides adapted to pass through said mortises, said tenons having substantially vertical slots or channels made in them and locking-bars pivoted to the sides intermediate between said slots, with which slots the ends of the bars are adapted to interlock.

4. The combination in a butter-mold of a base, independent separable sides and means including ledges on the base and a flange-and-groove connection between the ledges and the sides for locking sides to the base, two of said sides having mortises and coincident vertical channels formed near their ends, tenons formed on the other sides adapted to pass through the mortises, said tenons having vertically tapered or inclined channels made exterior to the sides through which they pass, bars centrally pivoted and turnable to engage said channels, said bars having the ends beveled or inclined to interlock with the channels and draw the sides of the mold firmly together.

5. The combination in a butter-mold of a base, independent sides with means for locking them to the base and to each other, a bottom and supports therefor, said bottom being formed of superposed sections to vary the length of the rolls and subdivided longitudinally into widths equal to the transverse width of each of the rolls when separated.

6. The combination in a butter molding and cutting apparatus of a base, sides adapted to be interlocked with the base and with each other to form a preliminary mold, vertically-slotted standards and means for removably attaching them to the base after the removal of the sides and a cutter movable in said slotted guides to separate the butter into rolls.

7. A butter molding and cutting apparatus consisting of a base, vertical sides and means for interlocking them with the base and with each other, and cutter-guiding standards with means for fitting and securing them to the common base to separate the mass into rolls, said standards having narrow slots for guiding the cutter, a bottom formed in removable sections equal in width to the transverse width of the rolls whereby each set of rolls may be lifted and transferred to independent receivers.

In witness whereof I have hereunto set my hand.

WILLIS SMITH FARNSWORTH.

Witnesses:
J. W. ROSE,
A. J. MCALPINE.